United States Patent [19]

Sano

[11] Patent Number: 4,982,621

[45] Date of Patent: Jan. 8, 1991

[54] LINE PRESSURE CONTROL SYSTEM FOR AUTOMATIC TRANSMISSION

[75] Inventor: Akihiko Sano, Fujisawa, Japan

[73] Assignee: Nissan Motor Company, Limited, Yokohama, Japan

[21] Appl. No.: 306,606

[22] Filed: Feb. 6, 1989

[30] Foreign Application Priority Data

Feb. 5, 1988 [JP] Japan .................... 63-24003

[51] Int. Cl.⁵ .............................. B60K 41/18
[52] U.S. Cl. .................................... 74/866
[58] Field of Search ............... 74/866, 867, 868, 869

[56] References Cited

U.S. PATENT DOCUMENTS

| | | | |
|---|---|---|---|
| 4,021,712 | 5/1977 | Ishihara et al. | 318/432 |
| 4,283,970 | 8/1981 | Vukovich | 74/866 |
| 4,653,350 | 3/1987 | Downs et al. | 74/866 X |
| 4,653,351 | 3/1987 | Downs et al. | 74/866 |
| 4,671,139 | 6/1987 | Downs et al. | 74/866 |
| 4,674,364 | 6/1987 | Shindo et al. | 74/867 |
| 4,680,992 | 7/1987 | Hayasaki et al. | 74/869 |
| 4,685,356 | 8/1987 | Iwatsuki | 74/866 |
| 4,706,522 | 11/1987 | Nitz | 74/866 |
| 4,707,789 | 11/1987 | Downs et al. | 74/867 X |
| 4,718,310 | 1/1988 | Shindo et al. | 74/867 |
| 4,722,247 | 2/1988 | Shindo et al. | 74/866 |
| 4,742,461 | 5/1988 | Eschrich et al. | 74/867 X |
| 4,781,080 | 11/1988 | Iwatsuki et al. | 74/867 |
| 4,791,568 | 12/1988 | Hiramatsu et al. | 74/869 X |
| 4,811,223 | 3/1989 | Iwatsuki et al. | 364/424.1 |
| 4,843,922 | 7/1989 | Kashihara | 74/866 |
| 4,846,021 | 7/1989 | Hamano et al. | 74/866 |

OTHER PUBLICATIONS

"Service Manual for Automatic Transmission of the RE4R01A Type", (A261C07), published in Mar. 1987 by Nissan Motor Company, Limited.

Primary Examiner—Dirk Wright
Attorney, Agent, or Firm—Foley & Lardner, Schwartz, Jeffery, Schwaab, Mack, Blumenthal & Evans

[57] ABSTRACT

The magnitude of line pressure used for activating a friction device to be engaged during a shift is controlled based upon data stored in a RAM of a microcomputer based control unit. The data is updated based on the result of evaluation of a shift which has taken place and the magnitude of line pressure is controlled based on this updated data at a future or subsequent time of occurrence of a shift of the same kind. This learning control to update this data stored in the RAM is effected using an inertia phase time measured as criteria which the judgement of the quality of a shift is based on. The total length of time for a shift is measured and when the total length of time is greater than a predetermined value, the data in the RAM is modulated to cause a prompt substantial increase in the magnitude of line pressure, so that the line pressure will be increased at the subsequent future time of the occurrence of a shift of the same kind.

7 Claims, 7 Drawing Sheets

LINE PRESSURE CONTROL SYSTEM FOR AUTOMATIC TRANSMISSION

RELATED APPLICATION

U.S. patent application Ser. No. 07/289,050, filed Dec. 23, 1988 in the mane of Hiroshi YAMAGUCHI, which application has been assigned to the same assignee which the present application is to be assigned to. The above-mentioned United States Patent Application claims priority based on Japanese Patent Application No. 62-327452 which was filed in Japan on Dec. 25, 1987.

BACKGROUND OF THE INVENTION

The present invention relates to a line pressure control system for an automatic transmission, and more particularly to a system for correcting the magnitude of line pressure at a time of occurrence of a shift in the automatic transmission.

In the automatic transmissions, a desired gear ratio is established by hydraulically activating selected one or ones of various friction devices (such as clutches and brakes) by line pressure, and a shift between two gear ratios is effected by changing friction device or devices to be activated.

If the line pressure is excessively high, transient engagement capacity of a friction device becomes excessively high, causing great shock to occur, whereas if the line pressure is excessively low, the transient engagement capacity of the friction device becomes excessively low, causing a slip to occur, thus shortening an operating life of the friction device. Thus, the line pressure has to be appropriately controlled. Conventionally, as described in the publication entitled "SERVICE MANUAL FOR AUTOMATIC TRANSMISSION OF THE RE4R01A TYPE" (A261C07) published in Mar. 1987 by NISSAN MOTOR COMPANY, LIMITED, a drain circuit of a line pressure regulator valve is opened or closed by a line pressure solenoid of the duty cycle type. The duty varies from 0% to 100%. When the duty is 0%, the line pressure solenoid is left OFF, closing the drain circuit, while when the duty is 100%, the line pressure solenoid is left ON, opening the drain circuit. Thus, increasing the duty causes the line pressure regulator to increase a magnitude of a line pressure generated thereby. Various values of the duty are contained in a stored data in a microcomputer based control unit for an automatic transmission. Different table data are provided, one for use at shifting operation, another for normal stable non-shifting operation, for example. The duty values are arranged in each table data as being retrievable by table look-up operation using a variable such as a throttle opening degree.

However, this conventional line pressure control system cannot cope with a situation where the line pressure solenoid has a manufacturing variation or the characteristic of the line pressure solenoid degrades with time or a situation where the friction device has manufacturing variations or the frictional materal of the friction device degrades with time. In the former situation, even if the line pressure solenoid is subject to the same duty, the magnitude of line pressure deviates from a target value. In the latter situation, even if the magnitude of line pressure is adjusted to the target value, the friction device does not show a desired performance characteristic. Thus, in any event, the conventional line pressure control system fails to avoid occurrence of substantial shift shock or reduction in operating life of the friction device.

An object of the present invention is to provide a line pressure control for an automatic transmission wherein the magnitude of line pressure used for activating a friction device during a shift is adjusted always to such an appropriate value as to cope with the above-mentioned situations.

Another object of the present invention is to provide a line pressure control system for an automatic transmission wherein the magnitude of line pressure is corrected by a learning control using a measured length of inertia phase time as criteria for adjusting the correction value.

More specifically, a further object of the present invention is to provide a line pressure control system for an automatic transmission wherein the magnitude of line pressure is corrected by a learning control using a measured length of inertia phase time as criteria for adjusting the correction value only when a measured total length of time for shifting is less than a predetermined value, and when the measured total length of time for shifting is greater than the predetermined value, the correction value is modulated to cause a substantial change in line pressure in a direction needed regardless of the measured length of inertia phase time.

SUMMARY OF THE INVENTION

According to the present invention, in order to cope with manufacturing variations or degradation with time of the component parts, an inertia phase time is measured in response to an input/output speed ratio of an change-speed gearing of an automatic transmission, and a line pressure acting on a shifting friction device is adjusted in such a direction as to bring an inertia phase time during a shifting into agreement with a predetermined value.

Specifically, there is provided a line pressure control system wherein the magnitude of a line pressure is corrected on a learning control using the inertia phase time measured as the criteria for varying a correction to the magnitude of the line pressure.

Specifically, there is provided a line pressure control system wherein the magnitude of a line pressure is corrected on a learning control using the inertia phase time measured as the criteria for varying a correction value to the magnitude of the line pressure, but the learning control is not effected when a total length of time required for shifting is greater than a predetermined value and the line pressure is varied in such a direction as needed.

Specifically, there is provided a line pressure control system for an automatic transmission wherein a shift between two speed ratio states involves activation of a friction device by a hydraulic fluid supplied under a line pressure a magnitude of which is variable, and the shift begins with a command for the shift and ending with a completion of an inertia phase wherein a speed ratio of an input shaft to an output shaft varies between the two speed ratio states owing to the activation of the friction device, said line pressure control system, comprising:

means for generating a speed ratio indicative signal indicative of a speed ratio of the input shaft to the output shaft;

means for measuring a total length of time of a shift beginning with the command for the shift and ending with the completion of the inertia phase and generating a total length of time indicative signal indicative of said total length of time measured;

means for comparing said total length of time indicative signal with a predetermined value; and means for increasing the magnitude of the line pressure at a future time of occurrence of the shift when said total length of time indicative signal is greater than said predetermined value.

Another aspect of the present invention resides in a method of correcting the magnitude of a line pressure used in an automatic transmission wherein a shift between two speed ratio states involves activation of a friction device by a hydraulic fluid supplied under the line pressure, a magnitude of which is variable, and the shift begins with a command for the shift and ending with the completion of an inertia phase wherein a speed ratio of an input shaft to an output shaft varies between the two speed ratio states owing to the activation of the friction device, said method comprising the steps of:

generating a speed ratio indicative signal indicative of a speed ratio of the input shaft to the output shaft;

measuring a total length of time of a shift beginning with the command for the shift and ending with the completion of the inertia phase and generating a total length of time indicative signal indicative of said total length of time measured;

comparing said total length of time indicative signal with a predetermined value; and increasing the magnitude of the line pressure at a future time of occurrence of the shift kind when said total length of time indicative signal is greater than said predetermined value.

BRIEF DESCRIPTION OF THE DRAWINGS

FIG. 5 shows a characteristic of variation of duty ratio which a line pressure solenoid is subject to;

DETAILED DESCRIPTION OF THE INVENTION

Figure 1:
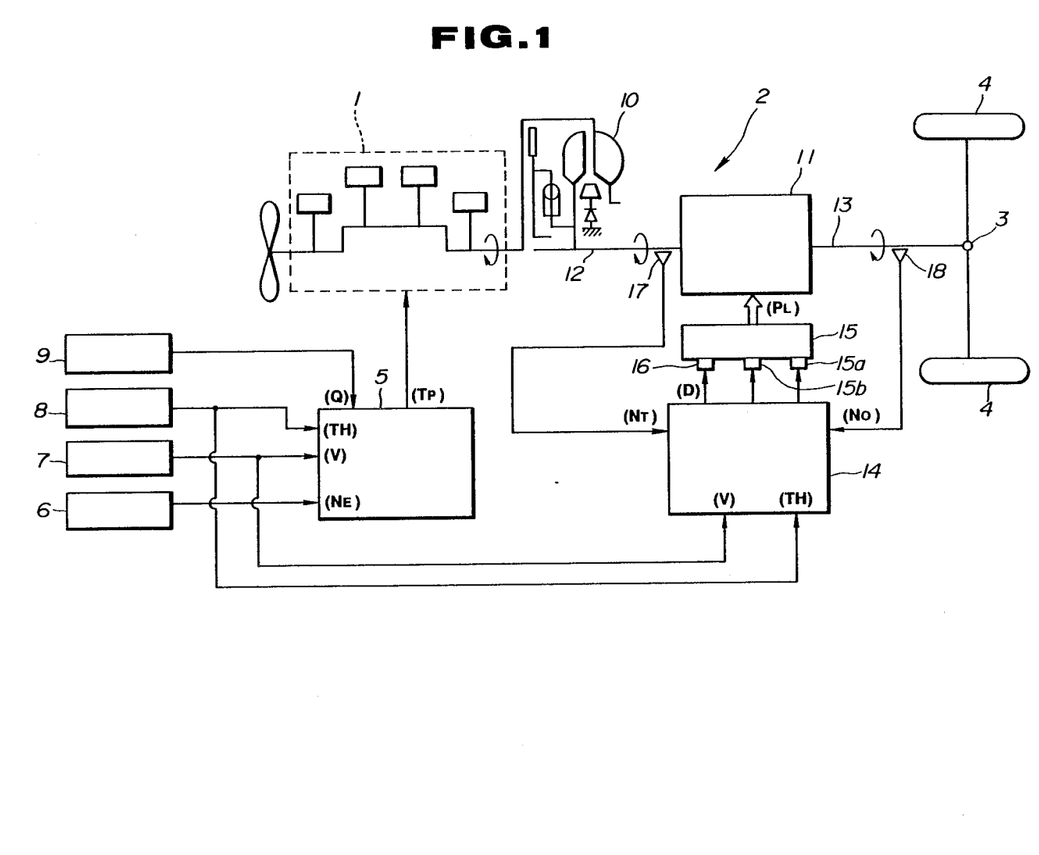
FIG. 1 is a block diagram of an automative powertrain control system incorporating a line pressure control according to the present invention.

Referring to FIG. 1, there is shown a powertrain control system for an automobile incorporating an embodiment of a line pressure control according to the present invention. The reference numeral 1 generally denotes an electronically controlled fuel injected engine, 2 an automatic transmission, 3 a differential gear, and 4 a pair of driving wheels.

The engine 1 is operatively associated with a microcomputer based engine control unit 5. Fed to the control unit 5 are output signals of the following sensors. They include an engine revolution speed sensor 6 for detecting an engine revolution speed $N_E$ and generating an engine revolution speed indicative signal indicative of the engine revolution speed $N_E$ detected, a vehicle speed sensor 7 for detecting a vehicle speed V and generating a vehicle speed indicative of the vehicle speed V detected, a throttle sensor 8 for detecting an engine throttle opening degree TH and generating an engine throttle opening degree indicative signal indicative of the engine throttle opening degree TH detected, and an intake air amount sensor 9 for detecting an engine intake air amount Q and generating an intake air amount indicative signal indicative of the engine intake air amount Q detected. The microcomputer based control unit 5 includes as usual a CPU (central processor unit), a ROM (read only memory), a RAM (random access memory), and an input/output control unit. What are performed by this microcomputer based control unit 5 include supplying the engine 1 with a command based on a pulse width $T_P$ of a fuel injection pulse train, which pulse width is determined after computation based on input informations carried by the sensor output signals, and supplying the engine 1 with a spark timing control signal. The latter control is not illustrated. The engine is supplied with an amount of fuel that is determined in proportion to the pulse width $T_P$ of the fuel injection pulse train, and operates on combustion of the fuel which occurs in timed relationship with the engine revolution.

The automatic transmission 2 includes a torque converter 10 and a change-speed gearing 11 arranged in tandem. The change-speed gearing 11 includes an input shaft 12 connected to a turbine runner of the torque converter 10 to receive an engine power after multiplication by the torque converter 10. Input rotation of the input shaft 12 is delivered to an output shaft 13 through the change-speed gearing 11 where the revolution speed is increased or decreased. The revolution speed of the output shaft 13 is delivered through the differential gear 3 to the pair of driving wheels 4, causing the automobile to run.

The change-speed gearing 11 includes various kinds of friction devices (not shown), such as clutches and brakes, which are selectively engaged to select one of power delivery paths with different speed ratios between the input and output shafts 12 and 13. The various friction devices are selectively and hydraulically activated by line pressure $P_L$ to select a desired speed ratio, and the frictional device or devices which are hydraulically activated are modulated to effect shifting to another speed ratio from the current speed ratio.

For this shifting control, there are provided a microcomputer based shift control unit 14 and a control valve assembly 15. The microcomputer based control unit 14 energizes selected one or ones of shifting control shift solenoids 15a and 15b within the control valve assembly 15 to accomplish a desired combination of ON and OFF states of the shift solenoids 15a and 15b, supplying the line pressure $P_L$ to selected one or ones of the various kinds of devices to establish a speed ratio corresponding to the desired combination of ON and OFF states of the shift solenoids 15a and 15b. In this manner, the shift control is effected. Another function by the microcomputer based control unit 14 is to perform duty control of a line pressure control duty solenoid 16 within the control valve assembly 15 by modulating a drive duty D, thereby to modulate the line pressure $P_L$ within the control valve assembly 15 according to the present invention. The relationship between the duty D and the magnitude of line pressure is such that the line pressure $P_L$ increases as the duty D increases. Supplied to the control unit 14 are the sensor signals of the vehicle speed sensor 7 throttle sensor 8. Also supplied to the control unit 14 are signals from an input revolution speed sensor 17 and an output revolution speed sensor 18. The input revolution speed sensor 17 detects a revolution speed $N_T$ of the input shaft 12, which may be called as a turbine shaft as it is drivingly connected to the turbine runner of the torque converter 10, while the output revolution speed sensor 18 detects a revolution speed $N_O$ of the output shaft 13.

The transmission 2 including the change-speed gearing 11 and the control valve assembly 15 with two shift solenoids 15a and 15b and line pressure solenoid 16 is well known and described in detail in the before mentioned publication entitled "SERVICE MANUAL FOR AUTOMATIC TRANSMISSION OF THE RE4R01A TYPE" (A261C07) published in Mar. 1987 by NISSAN MOTOR COMPANY, LIMITED. In order to fully understand how a gear ratio change is carried out by the two shift solenoids 15a and 15b and how the magnitude of line pressure is adjusted by the line pressure solenoid 16, reference should be made to U.S. Pat. No. 4,680,992, issued to Hayasaki et al. on July 21, 1987, which has been herein incorporated by reference in its entirety (see shift solenoids 42 and 44, and a line pressure solenoid 24 in FIGS. 1A, 1B and 1C).

Figure 2:
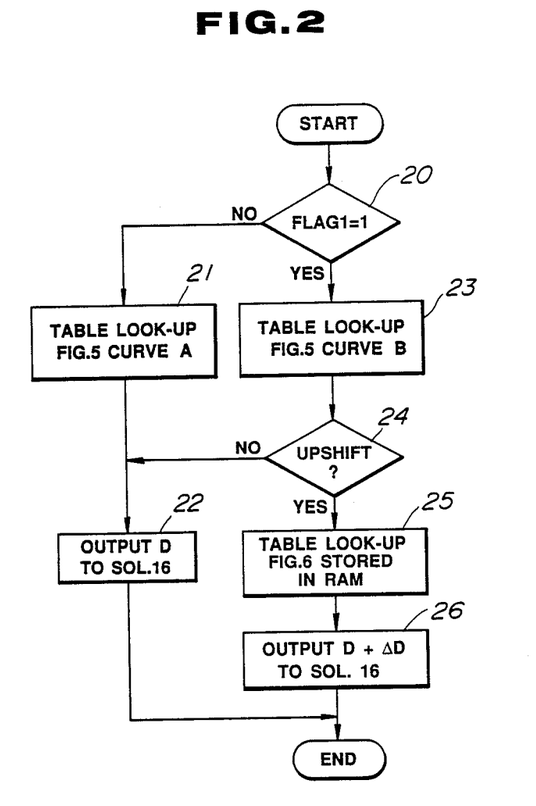
FIG. 2 to 4 are flow digrams of a line pressure control program and a shift control program.
Figure 3:
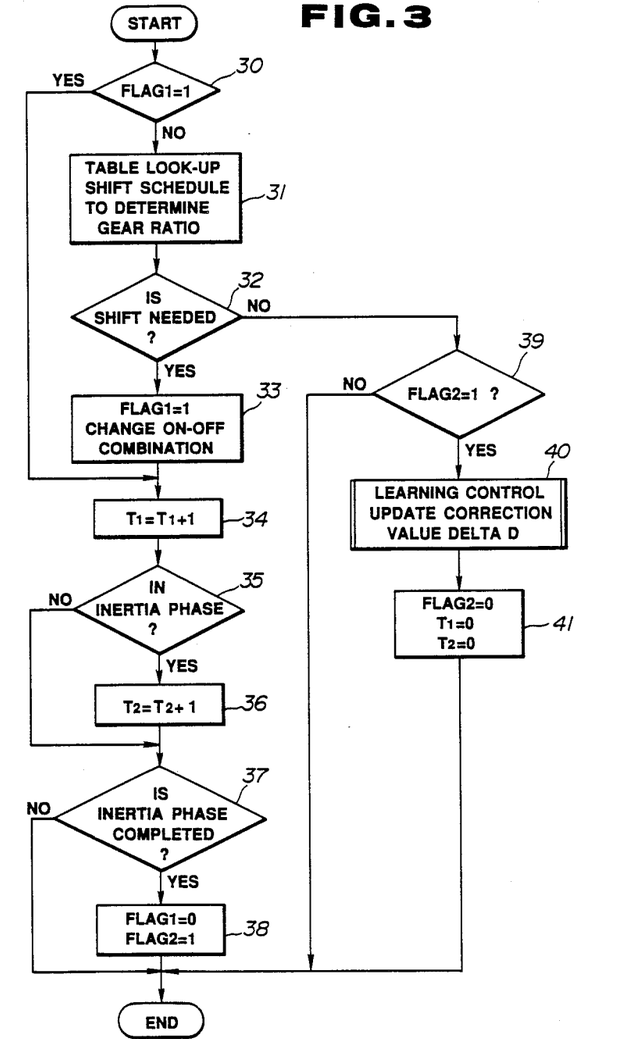
Figure 4:
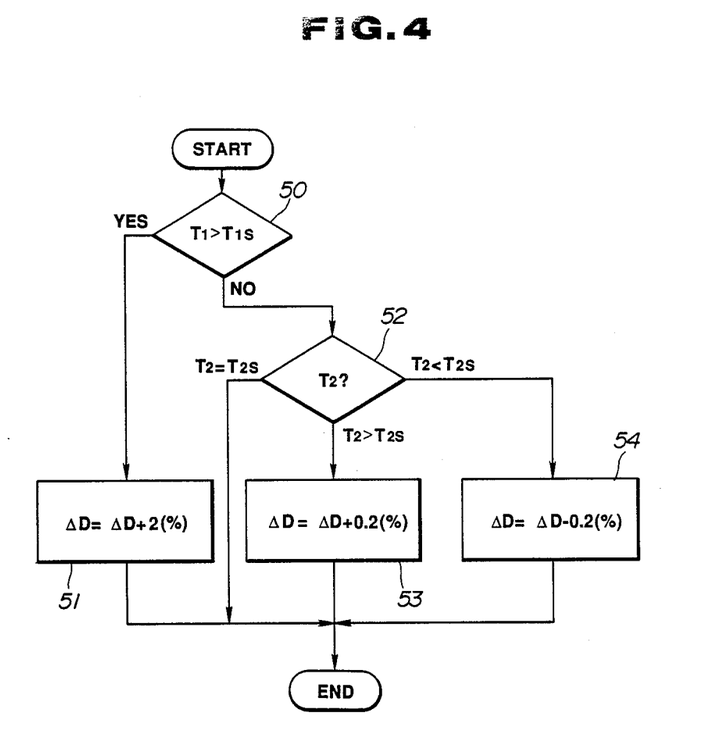

Referring to FIGS. 2 to 4, the above-mentioned line pressure control and shift control performed by the microcomputer based control unit 14 are explained along with flow diagrams illustrated. The flow diagrams illustrate control programs stored in the ROM of the microcomputer based control unit 14.

The execution of the line pressure control program as shown in FIG. 3 is initiated by a constant time interruption. At a step 20, a decision is made whether a flag FLAG1 is equal to 1 or not, thereby to determine that the change-speed gearing 11 is shifting when the flag FLAG1 is found to be equal to 1 and it is not shifting when the flag FLAG1 is 0 (zero). As a result, if the decision made at the step 20 indicates that the transmission is not shifting, the program proceeds to a step 21 where the CPU performs a table look-up operation of a map illustrated by a characteristic curve A shown in FIG. 5 to retrieve a drive duty D value corresponding to a throttle opening degree TH value indicated by the throttle opening degree indicative signal stored by a read-in operation at the preceding step not shown. Then, the program proceeds to a step 22 where the drive duty D obtained at the step 21 is supplied to the solenoid 16, adjusting the line pressure $P_L$ at the usual value suitable for operation of the change-speed gearing 11 when it does not undergo shifting.

Figure 5:
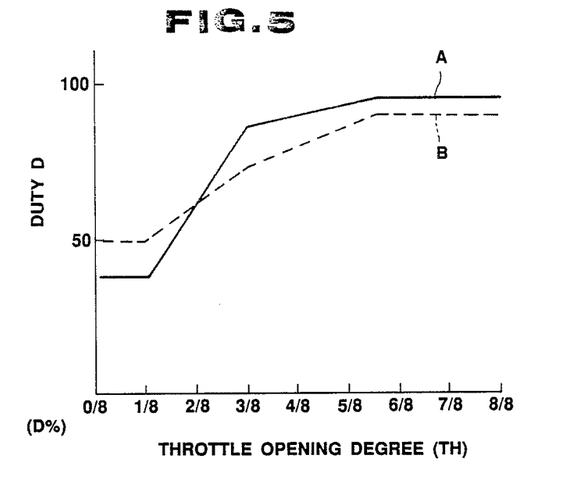
Figure 6:
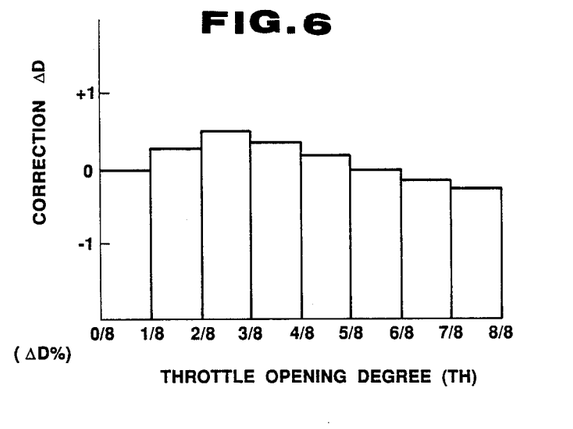
FIG. 6 is a diagram illustrating duty correction values contained in a table data stored in a RAM.

On the other hand, if the decision made at the step 20 indicates that the change-speed gearing 11 undergoes shifting, the program proceeds to a step 23 where the CPU performs a table look-up operation of a map illustrated by a characteristic curve B shown in FIG. 5 to retrieve a drive duty D value corresponding to a throttle opening degree TH value indicated by the throttle opening degree indicative signal stored by a read-in operation at the preceding step not shown. Then, the program proceeds to a step 24 where a decision is made whether the shifting is classified as an upshift or not. If it is not upshift, namely it is downshift, the program proceeds to the step 22 where the drive duty D value obtained at the step 23 is supplied to the solenoid 16. If the decision made at the step 24 indicates that the shifting is an upshift, the program proceeds to a step 25 where the CPU performs a table look-up operation of a data map as illustrated in FIG. 6 and stored in the RAM to retrieve a drive duty correction value ΔD (delta D) corresponding to a throttle opening degree value TH indicated by the throttle opening degree indicative signal stored at the preceding read-in step mentioned before. The data of this map is updated after learning control which will be later described. In the RAM, there are stored a plurality of such data maps provided for different kinds of upshift available, respectively. After executing the step 25, the program proceeds to a step 26 where the drive duty expressed by D+ΔD is supplied to the solenoid 16 to bring the line pressure $P_L$ to the value suitable for shifting.

FIG. 3 shows a control program for effecting a shift control and a solenoid duty correction value update control. The execution of this control program is initiated by a constant time interruption. In FIG. 3, at a step 30, it is decided whether the flag FLAG1 is equal to 1 or not. If the change-speed gearing 11 is not shifting and thus the flag FLAG1 is not equal to 1, the program proceeds from the step 30 to a step 31. At the step 31, the CPU performs a table look-up operation of a predetermined shift schedule diagram data map based on a vehicle speed value V and a throttle opening degree value TH which have been stored as a result of the preceding read-in operations of the sensor output signals of the vehicle speed sensor 7 and the throttle sensor 8 performed at the preceding read-in steps in the same run, not shown. As a result, a desired speed ratio is obtained most suitable for the vehicle speed V and throttle opening degree TH. Then, the program proceeds to a step 32 where it is decided whether a shift, namely a change in speed ratio, is needed or not based on whether a current speed ratio is the same as the desired speed ratio obtained at the step 31 or not. If such a shift is needed and thus the answer to the inquiry at the step 32 is YES, the program proceeds from this step 32 to a step 33. At the step 33, the flag FLAG1 is set equal to 1 and an ON-OFF combination of the shift solenoids 15a and 15b is changed to establish the desired speed ratio in the change-speed gearing 11. In the next and subsequent run, the steps 31, 32 and 33 are skipped as long as the flag FLAG1 continues to be equal to 1.

At the subsequent step 34, an increment is made to the content of a timer $T_1$ which is provided to measure a total length of time beginning with a shift command, namely at the instance when the flag FLAG1 is set equal to 1 at the step 33, and ending with the completion of the shift, namely the completion of an inertia phase involved in the shift. Thereafter, the program proceeds to a step 35 where it is decided whether an actual speed ratio $N_T/N_O$ falls in a predetermined range determined in view of a speed ratio before the shifting and a speed ratio upon completion of the shift or not. In this case, it is recognized that the inertia phase proceeds when the answer to the inquiry at the step 35 is YES. If the answer to the enquiry at the step 35 is YES, the program proceeds to a step 36 where an increment is made to a timer $T_2$. Upon completion of the inertia phase, the program proceeds from the step 35 to a step 37 bypassing the step 36. It will now be noted that the content of the timer $T_2$ represents a period of time of the inertia phase, namely, an inertia phase time.

At the subsequent step 37, it is decided whether the inertia phase is completed or not. This step is cooperating with the step 35 such that the answer to the inquiry at the step 37 becomes NO when the answer to the inquiry at the step 35 is YES, while the answer to the inquiry at the step 37 becomes YES when the answer to the inquiry at the step 35 is NO. Thus, when the inertia phase is completed, the program proceeds from the step 37 to a step 38 where the flag FLAG1 is reset to 0 (zero) and a flag FLAG2 is set equal to 1. This flag FLAG2 indicates whether a learning control to update the data stored in the RAM is to be executed or not.

In the subsequent run immediately after the completion of the shift, the program proceeds from the step 32 to a step 39. At the step 39, it is decided whether the flag FLAG2 is set equal to 1 or not. Since, in this case, FLAG2=2, the program proceeds from the step 39 to a step 40 where the above-mentioned learning control is effected to update the duty correction data $\Delta D$ (delta D) stored in the RAM and as illustrated in FIG. 6.

Figure 7:
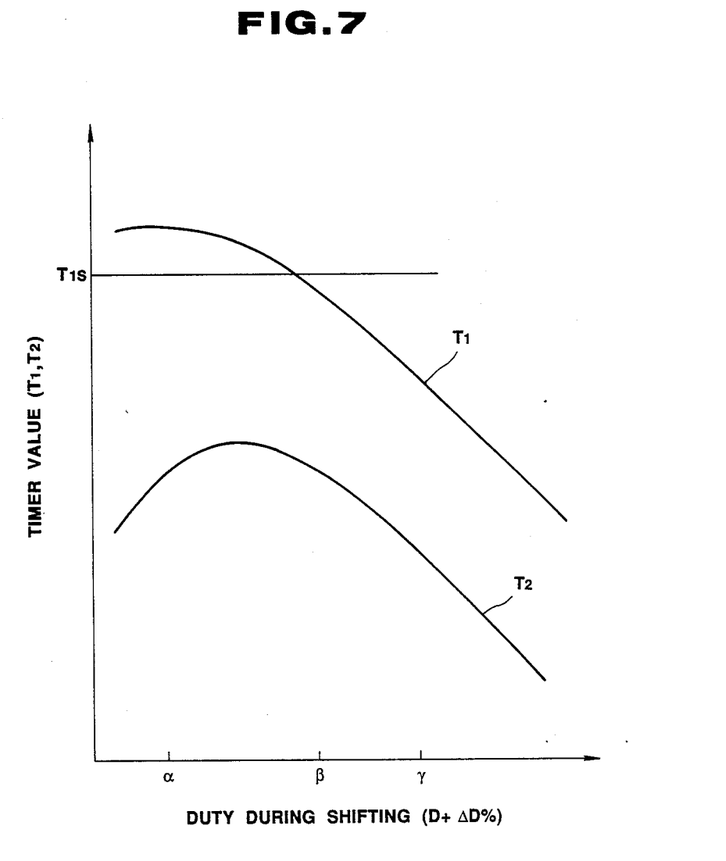
FIG. 7 shows variations of timer values versus various duty values.

Referring to FIG. 4, the execution of sub-program for learning control is initiated. In FIG. 4, at a step 50, it is determined whether the content of the timer $T_1$ is greater than a predetermined value $T_{1S}$ or not. This predetermined value is set equal to 1500 msec., for example. If desired, different lengths of time are set as the predetermined value and an appropriate one of them is selected depending on a kind of an upshift which has taken place immediately before evaluating the quality of the upshift. FIG. 7 shows the relationship between the lengths of time used to evaluate a 1-2 upshift and the various line pressure values. In FIG. 7, a curve $T_1$ indicates how the total length of time, namely a length of time beginning with the initiation of a 1-2 upshift (namely, the occurrence of a shift command) and ending with the completion of the upshift, varies against various line pressure values as expressed by duty values, whereas a curve $T_2$ indicates how the inertia phase time, namely a length of time beginning with the initiation of the inertia phase of the 1-2 upshift and ending with the completion of the inertia phase (viz., the completion of the upshift), varies against various line pressure values as expressed by duty values. As will be readily seen from these curves, when the total length of time $T_1$ is less than the predetermined value $T_{1S}$, the length of phase time $T_2$ is proportional to the value of line pressure as expressed by the value of duty. In other words, the time length of inertia phase can be used as the criteria which the quality of the shift can be evaluated on, and thus it is reasonable to vary the value of the duty depending on the result of measurement of the length of the inertia phase time of the preceding shift in correcting or updating the duty correction value data stored in the RAM. However, when the total length of time $T_1$ is greater than the predetermined value $T_{1S}$, the length of the inertia phase time decreases as the line pressure decreases. Thus, if the duty were still varied in accordance with the length of inertia phase time, the duty would be decreased further to cause a further drop in the magnitude of line pressure. More specifically, if the duty is excessively small and takes a small value, for example $\alpha$(alpha) in FIG. 7, the line pressure is extremely low so that there occurs a shift having the total length of time $T_1$ greater than the predetermined value. This shift is accompanied by an excessively great peak in transmission output torque, viz., a great shock, as shown by broken line drawn curve $\alpha$(alpha) in FIG. 8. In order to prevent the occurrence of the above-mentioned shift with substantially great shock, if it is decided at the step 50 that $T_1$ is greater than or equal to the predetermined value $T_{1S}$, the program proceeds to a step 51 where the correction value $\Delta D$ (delta D) is increased by 2%, and then back to a step 41 where the flag FLAG2 is reset and the timers $T_1$ and $T_2$ are reset. If the correction value $\Delta D$ (delta D) is increased in this manner, a shift of the same kind will take place with the line pressure at an increased level and thus the total length of time $T_1$ of this shift will become less than the predetermined value $T_{1S}$.

Figure 8:
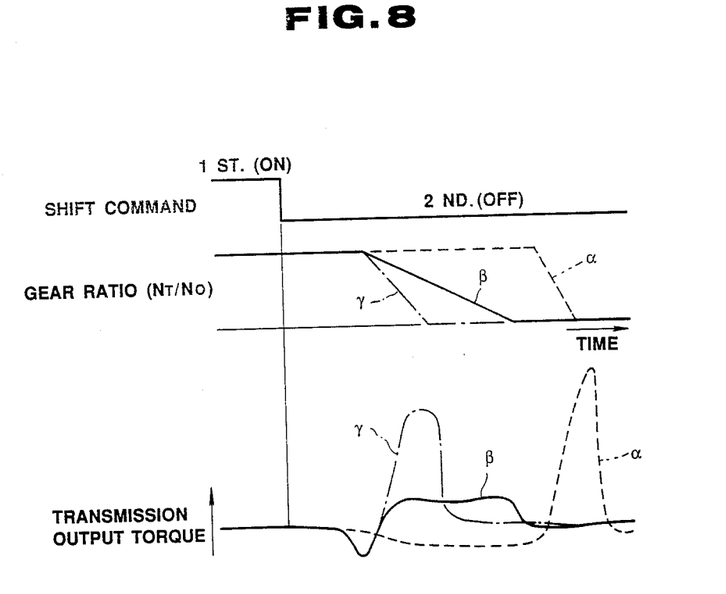
FIG. 8 are time charts illustrating operation diagrams of a 1-2 upshift when the line pressure with different magnitudes as expressed by duty values $\alpha$ (alpha), $\beta$ (beta), and $\gamma$ (gamma) are used.

Referring to FIG. 8, the one-dot chain line curves $\gamma$(gamma) show the variation of speed ratio, namely gear ratio, with respect to time and the variation of transmission output torque with respect to time when the 1-2 upshift takes place with the line pressure having an excessively high value as expressed by the duty $\gamma$(gamma) as shown in FIG. 7, whereas the fully drawn line curves $\beta$(beta) show the variation of speed ratio with respect to time and the variation of transmission output torque with the line pressure having an appropriate value as expressed by the duty $\beta$(beta) as shown in FIG. 7.

If the timer value $T_1$ is less than the predetermined value $T_{1S}$ and thus the program proceeds from the step 50 to a step 52 where the inertia phase time $T_2$ is compared with a target value $T_{2S}$. If the inertia phase time $T_2$ is equal to the target value $T_{2S}$ where the appropriate magnitude of line pressure is provided, the RAM data containing various correction values $\Delta D$ (delta D) shown in FIG. 6 are not modified. Thus, the current RAM data are used in the line pressure control for a shift which is to take place at a subsequent time. The target value $T_{2S}$ differs from one kind of shifting to another and it differs depending on the degree of throttle opening even with a shift of the same kind.

If, at the step 52, it is decided that the inertia phase time $T_2$ is greater than the predetermined value $T_{2S}$ and thus the line pressure is relatively low, the program proceeds from the step 52 to a step 53 where the correction value $\Delta D$ (delta D) in the RAM data is increased by 0.2%. Thus, the magnitude of line pressure at a future time of occurrence of a shift of the same kind will be increased in accordance with this increase in the duty.

If the inertia phase time $T_2$ is less than the predetermined value $T_{2S}$, the program proceeds from the step 52 to a step 54 since in this situation the line pressure is excessively high so that the engagement capacity of the friction device becomes excessisvely large, resulting in producing substantially great shock. At the step 54, the correction value $\Delta D$ (delta D) at the RAM data is decreased by 0.2%. Therefore, the magnitude of line pressure at a future time of occurrence of a shift of the same kind will be decreased in accordance with this decrease in the duty.

After executing the step 53 or 54, the program proceeds to the step 41 where the flag FLAG2 is reset and the timers $T_1$ and $T_2$ are reset, too.

As will now be understood from the previous description, the magnitude of line pressure is kept at the appropriate value by correcting data which the magnitude of line pressure is determined by learning control wherein the data is corrected in such a direction as to hold the inertia phase time $T_2$ at the predetermined value $T_{2S}$. Thus, a shock-free shifting without any reduction in operating life of the friction device is assured even in a situation where there are manufacturing variations and/or degradation with time of the component parts.

Besides, according to the present invention, when the total length of time $T_1$ exceeds the predetermined value $T_{1S}$, it is decided that the shifting with an excessively great shock took place and duty correction value is increased considerably by 0.2% regardless of how long the inertia phase time $T_2$ may be. As a result, the line pressure is promptly increased, thus quickly avoiding the occurrence of a shift with great shock.

In the preceding description, the present invention has been described along with the illustrated embodiment dealing with the upshift operation. However, the present invention is also applicable to the downshift operation.

What is claimed is:

1. A line pressure control system for an automatic transmission wherein a shift between two speed ratio states involves activation of a friction device by a hydraulic fluid supplied under a line pressure, a magnitude of which is variable, and said shift begins with a command for said shift and ends with a completion of an inertia phase wherein a speed ratio of a speed of an input shaft to a speed of an output shaft varies between two speed ratio states due to activation of said friction device, said line pressure control system, comprising:

means for generating a speed ratio indicative signal indicative of said speed ratio of a speed of said input shaft to a speed of said output shaft;

means for measuring a total length of time of a shift beginning with said command for said shift and ending with completion of said inertia phase and for generating a total length of time indicative signal indicative of said measured total length of time;

means for comparing said total length of time indicative signal with a predetermined value; and means for increasing said magnitude of said line pressure at a future time of occurrence of said shift when said total length of time indicative signal is greater than said predetermined value.

2. A line pressure control system for an automatic transmission wherein a shift between two speed ratio states involves activation of a friction device by a hydraulic fluid supplied under a line pressure, a magnitude of which is variable, and said shift begins with a command for said shift and ends with a completion of an inertia phase wherein a speed ratio of a speed of an input shaft to a speed of an output shaft varies between two speed ratio states due to activation of said friction device, said line pressure control system, comprising:

means for generating a speed ratio indicative signal indicative of said speed ratio of a speed of said input shaft to a speed of said output shaft;

means for measuring a total length of time of a shift beginning with said command for said shift and ending with completion of said inertia phase and for generating a total length of time indicative signal indicative of said measured total length of time;

means for comparing said total length of time indicative signal with a predetermined value;

means for effecting a learning control using an inertia phase time as a criteria for correction of said magnitude of said line pressure at a future time of occurrence of a shift of a same kind when said total length of time indicative signal is not greater than said predetermined value; and means for increasing said magnitude of said line pressure regardless of said inertia phase time at a future time of occurrence of said shift when said total length of time indicative signal is greater than said predetermined value.

3. A method of correcting a magnitude of a line pressure used in an automatic transmission wherein a shift between two speed ratio states involves activation of a friction device by a hydraulic fluid supplied under a line pressure, a magnitude of which is variable, and said shift begins with a command for said shift and ends with a completion of an inertia phase wherein a speed ratio of a speed of an input shaft to a speed of an output shaft varies between two speed ratio states due to activation of said friction device, said method comprising the steps of:

generating a speed ratio indicative signal indicative of said speed ratio of a speed of said input shaft to a speed of said output shaft;

measuring a total length of time of a shift beginning with said command for said shift and ending with completion of said inertia phase and generating a total length of time indicative signal indicative of said measured total length of time;

comparing said total length of time indicative signal with a predetermined value; and increasing said magnitude of said line pressure at a future time of occurrence of said shift when said total length of time indicative signal is greater than said predetermined value.

4. A method of correcting a magnitude of a line pressure used in an automatic transmission wherein a shift between two speed ratio states involves activation of a friction device by a hydraulic fluid supplied under a line pressure, a magnitude of which is variable, and said shift begins with a command for said shift and ends with a completion of an inertia phase wherein a speed ratio of a speed of an input shaft to a speed of an output shaft varies between two speed ratio states due to activation of said friction device, said method comprising the steps of:

generating a speed ratio indicative signal indicative of said speed ratio of a speed of said input shaft to a speed of said output shaft;

measuring a total length of time of a shift beginning with said command for said shift and ending with completion of said inertia phase and generating a total length of time indicative signal indicative of said measured total length of time;

comparing said total length of time indicative signal with a predetermined value;

effecting a learning control using an inertia phase time as a criteria for correction of said magnitude of said line pressure at a future time of occurrence of a shift of a same kind when said total length of time indicative signal is not greater than said predetermined value; and increasing said magnitude of said line pressure by a predetermined value regardless of said inertia phase time at a future time of occurrence of said shift of a same kind when said total length of time indicative signal is greater than said predetermined value.

5. A line pressure control system for an automatic transmission including a transmission input member and a transmission output member, said automatic transmission being shiftable between a first gear ratio and a second gear ratio and including a friction device which is adapted to be engaged in response to a magnitude of a line pressure to effect shifting between said first and second gear ratios, said line pressure control system comprising:

input sensor means for detecting a revolution speed of said transmission input member and for generating a first sensor output signal indicative of said revolution speed of said transmission input member;

output sensor means for detecting a revolution speed of said transmission output member and for generating a second sensor output signal indicative of said revolution speed of said transmission output member;

a control unit including means for repeatedly checking whether or not said automatic transmission effects shifting and for incrementing a first timer when said automatic transmission effects shifting such that a content of said first timer is indicative of a total time beginning with a command for shifting and ending with a completion of shifting;

means responsive to said first and second sensor output signals for determining an actual gear ratio of said revolution speed of said transmission input member to said revolution speed of said transmission output member;

means for setting a predetermined range based on said first and second gear ratios;

means for repeatedly checking whether or not said actual gear ratio falls within said predetermined range and for incrementing a second timer when said actual gear ratio falls within said predetermined range during shifting;

means for determining whether or not a content of said first timer is less than a first predetermined value after completion of shifting;

means for comparing a content of said second timer with a second predetermined value after completion of shifting when it is determined that a content of said first timer is less than said first predetermined value, said second predetermined value being less than said first predetermined value;

adjusting means for adjusting said magnitude of said line pressure which engages said friction device during a next occurrence of shifting in response to a result from comparing said content of said second timer with said second predetermined value after completion of shifting when it is determined that said content of said first timer is less than said first predetermined value; and means for increasing said magnitude of said line pressure which engages said friction device during a next occurrence of shifting after completion of current shifting when it is determined that said content of said first timer is not less than said first predetermined value.

6. A line pressure control system as claimed in claim 5, wherein said adjusting means includes a line pressure solenoid, and wherein said control unit contains first data and second correction data, means for controlling a drive signal supplied to said line pressure solenoid in response to a sum of said first data and said second correction data, and means for modifying said second correction data in response to said result from comparing said content of said second timer with said second predetermined value.

7. A method of controlling a line pressure for an automatic transmission including a transmission input member and a transmission output member, said automatic transmission being shiftable between a first gear ratio and a second gear ratio and including a friction device which is adapted to be engaged in response to a magnitude of a line pressure to effect shifting between said first and second gear ratios, said method comprising the steps of:

detecting a revolution speed of said transmission input member and generating a first sensor output signal indicative of said revolution speed of said transmission input member;

detecting a revolution speed of said transmission output member and generating a second sensor output signal indicative of said revolution speed of said transmission output member;

repeatedly checking whether or not said automatic transmission effects shifting and incrementing a first timer when said automatic transmission effects shifting such that a content of said first timer is indicative of a total time beginning with a command for shifting and ending with a completion of shifting;

determining, responsive to said first and second sensor output signals, an actual gear ratio of said revolution speed of said transmission input member to said revolution speed of said transmission output member;

setting a predetermined range based on said first and second gear ratios;

repeatedly checking whether or not said determined actual gear ratio falls within said predetermined range and incrementing a second timer when said actual gear ratio falls within said predetermined range during shifting;

determining whether or nor a content of said first timer is less than a first predetermined value after completion of shifting;

comparing a content of said second timer with a second predetermined value after completion of shifting when it is determined that a content of said first timer is less than said first predetermined value, said second predetermined value being less than said first predetermined value;

adjusting said magnitude of said line pressure which engages said friction device during a next occurrence of shifting in response to a result from comparing said content of said second timer with said second predetermined value after completion of shifting when it is determined that said content of said first timer is less than said first predetermined value; and increasing said magnitude of said line pressure which engages said friction device during a next occurrence of shifting after completion of shifting when it is determined that said content of said first timer is not less than said first predetermined value.

* * * * *